(12) United States Patent
Hars

(10) Patent No.: US 6,745,220 B1
(45) Date of Patent: Jun. 1, 2004

(54) EFFICIENT EXPONENTIATION METHOD AND APPARATUS

(75) Inventor: Laszlo Hars, Cortlandt Manor, NY (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 644 days.

(21) Appl. No.: 09/717,895

(22) Filed: Nov. 21, 2000

(51) Int. Cl.⁷ .................................................. G06F 7/38
(52) U.S. Cl. ......................................... 708/606; 380/28
(58) Field of Search ................................ 708/277, 491, 708/492, 493, 512, 517, 606; 380/28

(56) References Cited

U.S. PATENT DOCUMENTS

| | | | |
|---|---|---|---|
| 5,299,262 A | | 3/1994 | Brickell et al. |
| 5,828,590 A | * | 10/1998 | Chen et al. ............... 708/628 |
| 5,974,436 A | * | 10/1999 | Inoue et al. ............... 708/606 |
| 5,999,629 A | | 12/1999 | Heer et al. |
| 6,055,553 A | * | 4/2000 | Kantabutra ............... 708/277 |
| 6,363,407 B1 | * | 3/2002 | Miyasaka et al. .......... 708/606 |
| 6,567,832 B1 | * | 5/2003 | Ono et al. ................. 708/606 |

* cited by examiner

Primary Examiner—Chuong Dinh Ngo
(74) Attorney, Agent, or Firm—RatnerPrestia

(57) ABSTRACT

An encryption/decryption method performs an exponentiation operation on a base number where both the base number and the exponent may be large numbers (i.e., anywhere from 100 to several thousand bits long). The exponent is expressed as a bit string. The bit string is then re-coded utilizing the signed digit algorithm. Predetermined substring patterns are then extracted from the exponent utilizing a string replacement method and compared to a previously constructed look-up table containing exponent values for only a relatively small number of predetermined substrings. The value returned from the look-up table is the base value raised to the power represented by the substring. A pointer for each matching substring in the exponent is stored. The remaining bits in the exponent and intermediate values and are then processed with the base value using a multiply chain algorithm to determine the value of the base raised to the exponent.

22 Claims, 3 Drawing Sheets

EFFICIENT EXPONENTIATION METHOD AND APPARATUS

BACKGROUND OF THE INVENTION

This invention relates generally to computer implemented exponentiation methods and more specifically to a method for exponentiation that is faster and has lower memory requirements than other computer implemented methods.

The encryption of data for communication and storage utilizing a computer system is well known in the art. The encrypting of data is accomplished by applying a cipher to the data to be encrypted. The cipher can be known only to the encrypter and recipient (a "symmetric encryption" scheme) or can be a combination of a widely known cipher coupled with a securely held cipher (a "public key" scheme).

Some of the more popular methods, because of the ease of use and the relative invulnerability to breaking, are "public key" systems of cryptography. These methods utilize complex mathematical formulas employing large exponents (i.e., exponents of several hundred bits or more) to increase the difficulty of unauthorized decryption.

One example of this method is the RSA method, named for its developers Rivest, Shamir, and Adleman. The RSA method is more fully described in RFC-2437 entitled "PKCS #1: RSA Cryptography Specifications Version 2.0.

An RSA public key consists of two components: n, the modulus, a nonnegative integer and e, the public exponent, also a nonnegative integer. In a valid RSA public key, the modulus n is a product of two odd prime numbers p and q, and the public exponent e is an integer between 3 and n−1 satisfying gcd (e, \lambda(n))=1, where \lambda(n)=1 cm (p−1, q−1), gcd (x, y) is the greatest common divisor of x and y, and 1 cm (x, y) is the least common multiple of x and y.

The RSA method involves solving the equation $$c = m^e \bmod n$$

where (n, e) are the RSA public key; m is the message representative, an integer between 0 and n−1, and c is the encrypted result of the exponentiation and modulo division.

The message is decrypted by the receiver by calculating $m = c^d \bmod n$, where d is a private exponent. Thus, exponentiation is used both to encode and decode the message.

Another popular method of encryption is the Public Key Cryptosystem (PKC) proposed by T. ElGamal. According to this method, a prime number p is chosen and a primitive root g of p is chosen. User U selects an arbitrary number u and calculates $g^u = \alpha \bmod p$, where α is a residue of g to the u'th power modulo p. User V selects an arbitrary number v and calculates $\beta = g^v \bmod p$. The parties exchange the residues α and β, and each then calculates a common key value; for User U, k=β$^u$ modulo p and for User V, k=α$^v$ modulo p. The data to be encrypted is then processed arithmetically, using k to transform the data; for example, by forming the exclusive-OR of the data and k. The same operation is used to decrypt the data. Again, exponentiation is used both by the message sender and the message receiver to calculate the key that is used to encrypt or decrypt the data.

Extremely large exponential values, however, extract a cost to the user in terms of the number of multiplications required and/or the amount of computer memory that is used to perform the operations. These types of multiply operations are costly because the values to be multiplied exceed the bit-length of the processor and, thus, are implemented as multi-precision operations.

A number a raised to an exponent e can always be calculated by multiplying that number by itself the number of time represented by the exponent, or in mathematical terms:

$$a^e = a * a * a \ldots e \text{ number of times.}$$

Another method, which is significantly faster, is the multiply chain algorithm. In this case, let $e = e_{n-1} e_{n-2} \ldots e_1 e_0$ be an n-bit exponent $e_i \in \{0,1\}$, $0 \le i \le n-1$ and $e_{n-1} = 1$. The algorithm starts with $p_1 = a$, then $$p_{i+1} = p_i^2 \text{ if } e_{n-1-i} = 0 \text{ or } a * p_i^2 \text{ if } e_{n-1-i} = 1, \text{ where } 1 \le i \le n-2.$$

Several methods are known in the art to reduce either the number of multiplications or the amount of computer memory needed to produce efficient exponentiation of the base value.

One method known to reduce the number of multiplications is the signed digit algorithm. In this method, the exponent is represented as a string of bits comprising the values 0 and 1. Within the bit string, sequences (or "runs") of 1's are replaced by 0's, with a 1 being placed in the next higher bit position to the most significant bit (MSB) position of the run, and "−1" being inserted in the least significant bit (LSB) position of the run. By thus efficiently recoding the exponent bit string, the expected number of multiplications is reduced from n/2 to n/3.

Another method known in the art for reducing the number of multiplications by utilizing memory, is the "sliding window method." In this method, the exponent is again represented as a string of 0 and 1 bits. Substrings of a predetermined fixed length are extracted and examined against a reference look-up table, which contains the base value raised to specific powers. The substring under examination is used as a reference value to look-up the value of the base raised to the power represented by the numerical value of the bit string, and the intermediate value is stored, with a reference to the position of the least significant bit in the bit string that corresponds to the pattern. After traversal of the exponent bit string, the intermediate values are then multiplied together using a multiply chain algorithm to determine the base value raised to the original exponent value.

Computer based means of encryption and decryption of communication are well known in the art. However, most advanced encryption and decryption methods are too time consuming or memory intensive, or both, for use on small devices with limited computer usage cycles or memory. As such, there is a need for a more efficient exponentiation method in terms of both the computer cycles used and the amount of memory that is consumed.

SUMMARY OF THE INVENTION

The present invention combines two recoding methods for exponentiation in a novel way. The first method is the "signed digit algorithm" and the second is a modified "sliding window" method referred to below as the string replacement method. The combination these two methods allow data to be encrypted and decrypted using a smaller number of computer cycles and less memory than prior techniques.

The subject invention is embodied in an encryption/decryption system that performs an exponentiation operation on a base number where both the base number and the exponent may be extremely large numbers (i.e., anywhere from 100 to several thousand bits long). The exponent is expressed as a bit string. The bit string is then re-coded utilizing the signed digit algorithm to eliminate runs of '1's, by replacing them with patterns of runs of '0's' delimited by a '1' at the bit position just above the most significant bit and '−1' as the least significant bit position of the run. Predetermined substring patterns are then extracted from the exponent in a manner similar to the sliding window method. The extracted strings are compared to a previously constructed look-up table containing exponent values for only a relatively small number of predetermined substrings. At each non-zero bit in the exponent, the longest such substring ending at that position is found in the lookup table and the corresponding bits in the exponent are set to zero except the rightmost bit. In this bit position is stored a reference to the corresponding entry in the look-up table. The value returned from the look-up table is the base value raised to the power represented by the substring. The exponent bit string is traversed from right to left (i.e. from the least significant bit position to the most significant bit position) until all such substrings have been extracted and corresponding references to the look-up table have been stored. The remaining bits in the exponent and intermediate values and are then processed using a multiply chain algorithm to determine the value of the base raised to the exponent.

Other features and advantages of the invention will be set forth in, or apparent from, the following detailed description of the preferred embodiment of the invention.

BRIEF DESCRIPTION OF THE DRAWINGS

The foregoing summary as well as the following detailed description of exemplary embodiments of the invention, will be better understood when read in conjunction with the appended drawings. For the purpose of illustrating the invention, there is shown in the drawings several exemplary embodiments of the invention. It should be understood, however, that the invention is not limited to the precise arrangements and instrumentalities shown. In the drawings.

DETAILED DESCRIPTION OF THE INVENTION

Figure 1:
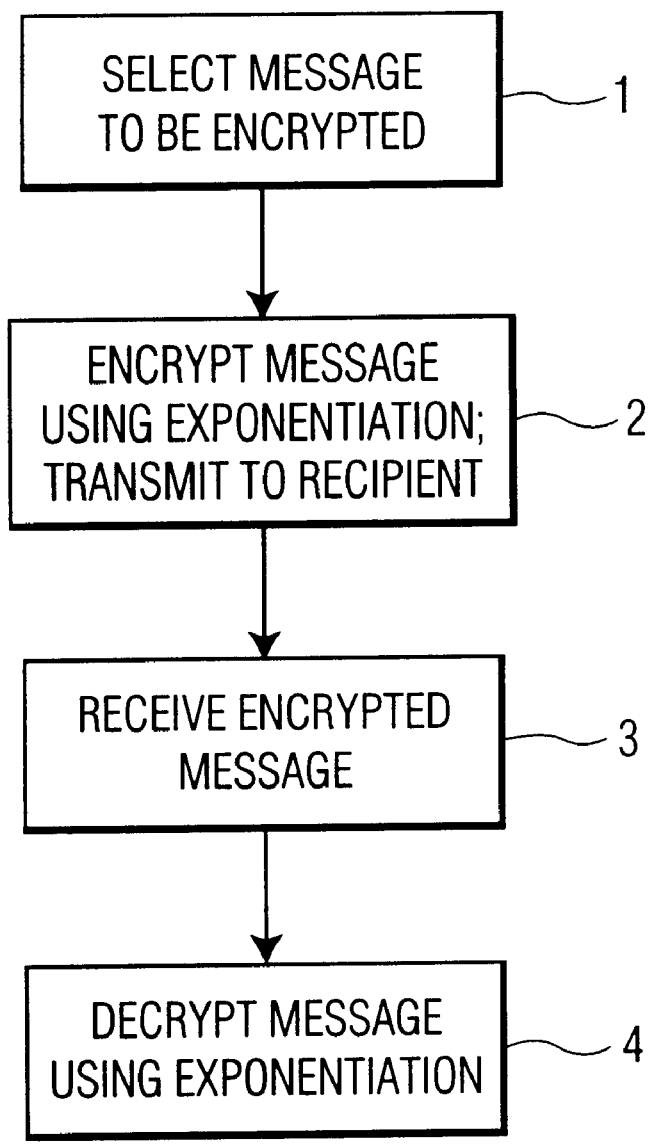
FIG. 1 is a flow chart diagram illustrating an exemplary embodiment of the present invention.

FIG. 1 is a flow-chart diagram that illustrates the operation of an exemplary encryption/decryption process. In step 1, the user selects data or a message to be encrypted. At step 2, the user encrypts the data or message using an encryption method that employs exponentiation, either to encode the data or to determine the value of the key that is used to encode the data. Also at step 2, the encrypted data is transmitted to the recipient. Next, at step 3, the recipient receives the encrypted data or message and, at step 4, the recipient decrypts the encrypted data using a decryption method that employs exponentiation.

The present invention is an improved exponentiation method which combines the signed digit method with the string replacement method, a modified sliding window method, to produce an exponentiation method that uses less memory than the string replacement method and is faster than both the string replacement method and the signed-digit method. The combination of these two methods is not obvious, because the application of the signed digit algorithm reduces the string pattern to runs of "0's" delimited by "1's" or "−1's", which negates the effectiveness of the string replacement method, because the "window" would be framing mostly "0's". Conversely, traversing the bit string using a window prior to application of the signed digit algorithm would remove all the runs of "1's" from the bit string and render the application of the signed digit algorithm superfluous. The method disclosed here combines these methods by utilizing the "string replacement method" to key on only certain bit structures that result from application of the signed digit algorithm.

Figure 2:
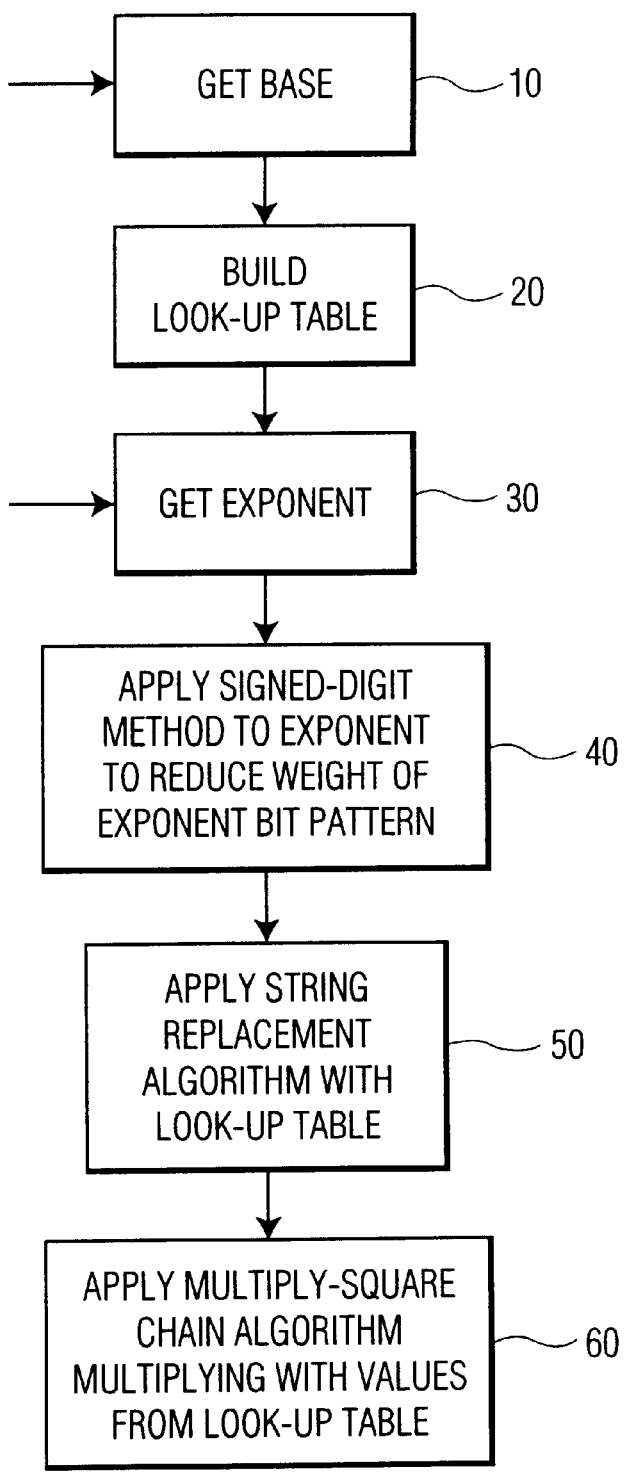
FIG. 2 is a flowchart of the implementation of the invention.

The operation of the algorithm is described with reference to FIG. 2. At step 10 of FIG. 2, a base value is stored in memory. This base value is the message to be encrypted. Next, at step 20, a look-up table is constructed, based on the most probable values to be encountered in the encryption of the base value. These most probable values are best determined by numerical analysis, as described below. The look-up table consists of a look-up field, being strings most likely to be encountered in the re-coding set forth below, and a reference value, being the base value raised to the power represented by the look-up field. A representative format for the lookup table is given in Table 1:

TABLE 1

Example of lookup table for returning values while traversing the exponent bit string

| LOOK-UP FIELD | REFERENCE VALUE |
| --- | --- |
| + 0 − (3) | $base^3$ |
| + 0 + (5) | $base^5$ |
| + 00 − (7) | $base^7$ |

In this table, "+" represents the digit "1" and "−" represents the digit "−1."

At step 30, the exponent is stored in memory as a bit string, being the representation in string form of the binary value of the exponent. At step 40, the bit string is then recoded utilizing a signed digit algorithm to generate a processed binary exponent value as follows:

Starting from the right most bit, the exponent bit string is traversed until a non-zero bit is found, and a pointer set at that position. From that point, the string is traversed until a zero bit is found and a second pointer set at the position of the zero bit. If the distance between the pointers is greater than 1 (i.e., a run of '1's' has been found), a "1" is inserted at the second pointer, all the "1's" between the pointers are replaced by "0's", and the "1" pointed to by the right most pointer is replaced by "−1". The first pointer is set to the position to the second pointer (i.e., a new starting position to the immediate left of the end position of the most recent substring), and the process is applied again until the entire exponent bit string has been traversed and recoded into the processed binary exponent value.

Table 2 shows the expected frequency of occurrence of certain bit patterns in an exponent, after application of the signed digit algorithm as set forth above. The results shown are based on 1000 random exponents of length at most 160 bits, and represent the occurrences of the special bit structures. The lookup table can be constructed with only those values having an expected frequency of occurrence greater than 1.0, because those values having an expected frequency of occurrence less than 1.0 are less likely to be accessed, and therefore, the time constructing the table is less likely to be recovered.

TABLE 2

| Bit Pattern | Freq. | Bit Pattern | Freq. | Bit Pattern | Freq. | Bit Pattern | Freq. | Bit Pattern | Freq. |
|---|---|---|---|---|---|---|---|---|---|
| +0−=3 | 6.91 | +0−0−=11 | 1.47 | +0−00−=23 | 0.65 | +00−0−=27 | 0.75 | +00−00−=55 | 0.33 |
| +0+=5 | 6.83 | +0−0+=13 | 1.42 | +0−00+=25 | 0.70 | +00−0+=29 | 0.75 | +00−00+=57 | 0.35 |
| +00−=7 | 3.46 | +0+0−=19 | 1.40 | +0+00−=39 | 0.71 | +00+0−=35 | 0.71 | +00+00−=71 | 0.36 |
| +00+=9 | 3.34 | +0+0+=21 | 1.42 | +0+00+=41 | 0.70 | +00+0+=37 | 0.70 | +00+00+=73 | 0.35 |
| +000−=15 | 1.70 | | | | | | | | |
| +000+=17 | 1.67 | | | | | | | | |
| +0000−=31 | 0.86 | | | | | | | | |
| +0000+=33 | 0.87 | | | | | | | | |

Thus, the table of exponents that are precalculated according to the present invention includes 10 values, $m^3$, $m^5$, $m^7$, $m^9$, $m^{11}$, $m^{13}$, $m^{15}$, $m^{17}$, $m^{19}$, and $m^{21}$. The corresponding negative values may also be calculated and stored, or, as described below, the negative values may be handled by using a sign bit in the exponent bit position. During the multiply square chain algorithm in which the final exponent is calculated, the multiple multiplications represented by each of these binary values is replaced by a single multiplication, multiplying the accumulated value by the stored value for the identified string, when the bit of the exponent corresponding to the LSB of the identified string is processed. Because the calculation of the stored value, itself, represents one or more multiplication operations, the application of the string replacement algorithm to the exponent after the string has been processed using the signed digit algorithm is only beneficial for strings that are likely to occur more than once in the modified exponent.

Based on the data in Table 2, the lookup table constructed for an exponent of length at most 160 bits could efficiently use the above strings as look-up values, and return the base value stored in step 10 raised to the corresponding powers. The table is constructed using only odd powers, because the string replacement method, by framing the window with non-zero bits, guarantees that only odd exponents will be used.

At step 50, and as shown in detail in FIG. 3, the processed binary exponent value (which becomes non-binary) is traversed using a string replacement method as follows:

In step 51, a pointer is set to the rightmost position of the processed binary exponent value and, at step 52, the algorithm traverses the processed binary exponent value bit position by bit position until a non-zero bit is found. If no non-zero bit is found at step 52, the traversal ends, as shown in step 53. If a non-zero bit is found in step 52, then, a first pointer points to the a right-most non-zero (±1) digit of the identified substring and at step 54, a second pointer is set to point to the position of the left-most non-zero digit. In step 55, the second pointer is moved to the right, comparing successively shorter substrings of the processed binary exponent value having an LSB corresponding to the first pointer are then compared with the lookup table to determine a longest reference value matching a substring of the processed binary exponent value ending at the pointer. In step 56 the algorithm determines if there is a match. If step 56 indicates that there is a match, then at step 57, all of the non-zero digits in the matching substring are set to zero, and, at step 58, the algorithm inserts the index of the reference value stored in the lookup table, being the base value raised to the exponent represented by the substring, into the position of the LSB of the matching substring in the exponent. After step 58 or, after step 56 if no match was found, the recoding and replacement method just described is applied again starting at the next non-zero bit position to the left of the first pointer. If no match is found in the look-up table at step 56, then the ±1 bit at the first pointer is left unmodified and the next right-most ±1 is examined to determine if any substrings including this bit match entries in the look-up table. This process continues until the entire processed binary exponent value has been traversed and the matched substrings have been replaced by "0's" and references to the look-up table. To achieve a factor of 2 reduction in the size of the look-up table, only the positive substring values may be stored. Negative substrings are indicated by inserting the reference to the positive entry and marking the reference to indicate that the value is negative.

It is contemplated that either the signed digit method, the string replacement method or both may be implemented as recursive processes. In this alternative, after recognizing and processing a substring of ones or a matching substring in the exponent, the process is invoked within itself to recognize and process the next substring. To speed up the recursive process, it may include a parameter representing the MSB position in the exponent value of the current substring. This parameter is the starting position for the process in its next instantiation. Initially, this value is set to zero.

In step 60, the modified binary exponent with the indices into the look-up table, the zero bits and the remaining ±1 digits are processed utilizing a multiply square chain algorithm to get a resulting value, being the base raised to the original exponent. When the multiply square chain algorithm is applied to the modified exponent, at any stored table index, the corresponding table value multiplies the accumulated value at the step in the algorithm corresponding to the bit position in which the index was stored. If a stored index is the MSB of the exponent, the algorithm begins with the corresponding value from the look-up table as the accumulated value. All of the bits remaining in the exponent are handled in the same way as when the multiply square chain algorithm is applied after performing a signed digit transformation except that, when the index is marked as being negative, a division operation is performed in place of the multiplication operation. In step 70, this resulting value is then returned to the encryption algorithm for further processing.

While the algorithm shows the exponent being traversed from LSB position to MSB position, in both the signed digit processing and in the string replacement portion of the algorithm, it is contemplated that in either on or both of these steps, the exponent may be traversed from the MSB position to the LSB position.

An example is given, to illustrate the present invention:

The character '6' is to be encrypted. The exponent chosen for this example is 55, although in reality the exponent will be 100 or more bits. The character '6' has a binary representation of 00000110, which has an integer value of 6. Therefore, '6'$^{55}$ ≈6.285195213566005e+42.

55is represented as a bit string by "110111".

The base value '6' is stored in memory as the numeric value 6. The lookup table is constructed for the values 6$^3$ through 6$^{21}$ for the odd exponents, as described above, because the exponent in this example is less than 160 bits (the values used to generate Table 2).

Applying the signed digit algorithm to this string, a pointer is first set to the rightmost "1". The bit string is traversed by a second pointer position by position to the left, until a "0" is encountered. The second pointer is then set to the position of the "0" bit, immediately to the left of the substring "111". This is converted to "+00−", resulting in an intermediate string of "11+00−". The algorithm then resets the first pointer to point to the bit position of the second pointer (the "+"), and continues to traverse the bit string from that position. As above, the bit string is traversed by a second pointer position by position to the left, until a "0" or the end of the string is encountered (i.e. At a position greater than the MSB position of the bit-string), matching the "11+", which would be replaced by "+00−". The resulting processed binary exponent value would be "+00−00−"=64−8−1=55. Thus, the number of multiplication operations is reduced from 4 to 2.

Figure 3:
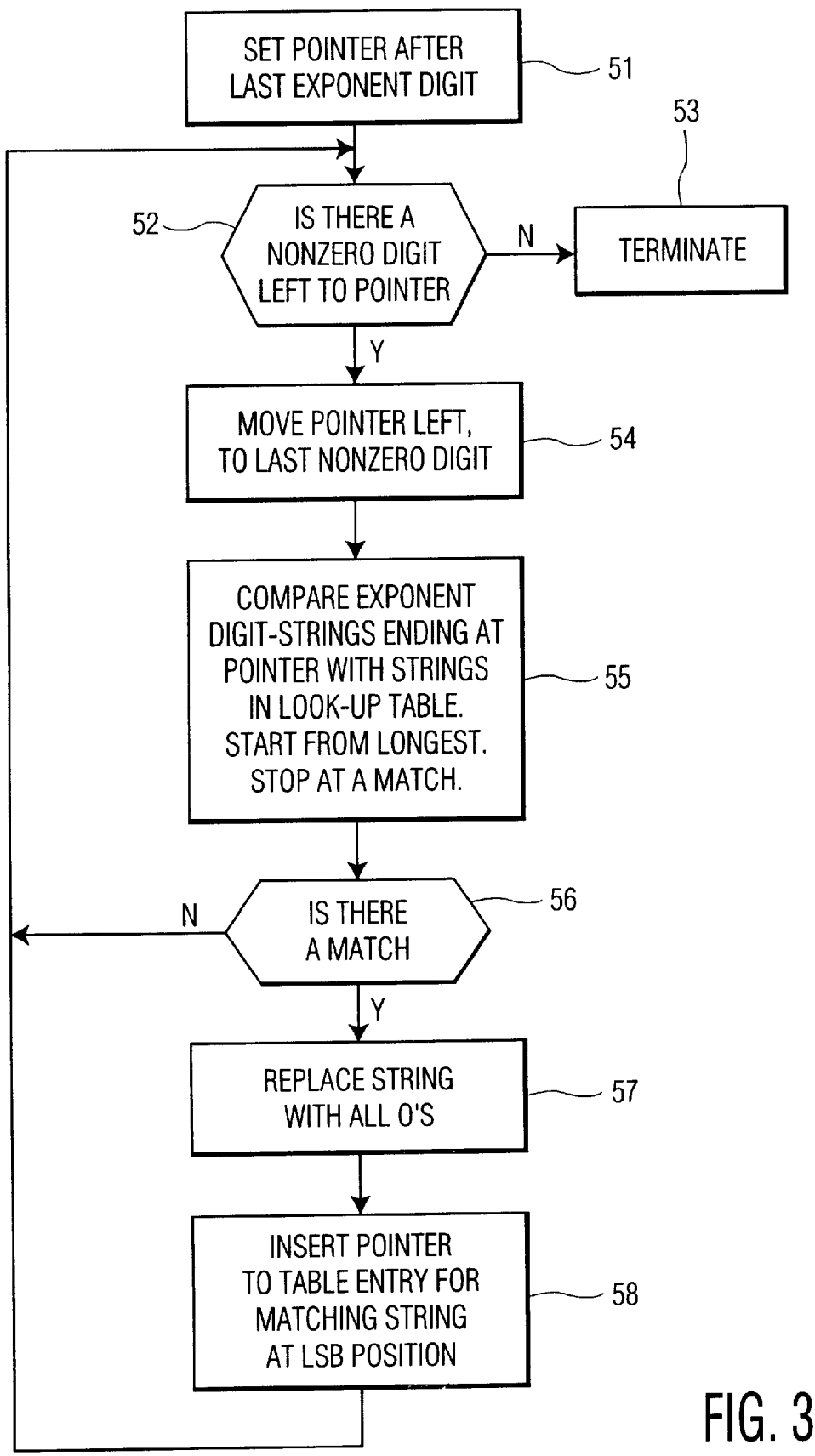
FIG. 3 is a detailed flowchart of the retrieval of intermediate values from the lookup table.

The application of the string replacement method to retrieve values from the lookup table, as detailed in FIG. 3, to be used in the multiply chain algorithm, is the next step. A pointer is set at the right-most non-zero digit, being "−". For sake of this example, the largest matching string in the lookup table is "−00−", which corresponds to a look-up table value of 10077696 (being 6 raised to the 9$^{th}$ power), with a marker on the index to indicate that the value is negative. The substring "−00−" is replaced by "0's", leaving an intermediate string of "+00000(−9)", where (−9) represents the pointer to the 9 entry of the look-up table, marked to indicate that the value is negative.

The intermediate string is then be traversed position by position from the last unprocessed position until a non-zero bit is found, and a pointer set at that position. In this instance, there is no match. The multiply chain algorithm uses the value +00000(−9) to calculate the exponential value. In this instance, the value 6 is squared six times, once for each of the six bit positions in the recoded exponent to produce a value of approximately 6.33e+49. At bit position 0, the resulting value is divided by the look-up table value 10077696 to produce the resulting exponential value (i.e. 6$^{64}$/10077696≈6.28e+42). Thus, application of the modified string replacement operation further reduced the two multiplication operations to one operation.

The encryption method determines the value of the exponential value modulo the prime number and uses this value in place of the character '6', in the encrypted message.

While the invention has been described as a method, it is contemplated that it may be implemented as apparatus, for example, as a part of an application specific integrated circuit (ASIC) or other special purpose data processing circuitry. In addition, it may be embodied in computer software on a computer-readable carrier such as a solid-state or magnetic memory; a magnetic or optical disk, tape or memory card; or on in a radio-frequency or audio frequency carrier.

While the invention has been described in terms of an exemplary embodiment, it is contemplated that it may be practiced as described above, with variations within the scope of the appended claims.

What is claimed:

1. A computer implemented method for calculating an encrypted value representing a data string raised to a power represented by a binary exponent value, the method comprising the steps of:

applying a signed digit algorithm to the binary exponent value to generate a processed exponent value;

constructing a look-up table of substrings that are likely to be encountered in the processed exponent value each entry in the look-up table corresponding to the data string raised to the power represented by the respective substring;

applying a string replacement method to traverse the processed exponent value and retrieving, from the lookup table, and recording, intermediate values corresponding to matching substrings in the processed exponent value and replacing the matching substrings in the processed exponent value by zeros and a reference to the look-up table to produce a modified recoded string representation of the exponent value; and applying a multiply-square chain algorithm to the recoded exponent value using the look-up table to calculate the encrypted value representing the data string raised to the recoded exponent value.

2. A computer implemented method according to claim 1, wherein the step of constructing a look-up table of substrings that are likely to be encountered in the processed exponent value includes the step of defining an entry in the table for each substring that has an expected frequency of occurrence in the processed exponent value that is greater than one.

3. A computer implemented method according to claim 2, wherein the processed exponent value is between 100 and 200 bits in length and the look-up table includes entries corresponding to substrings representing the values 3, 5, 7, 9, 11, 13, 15, 17, 19 and 21.

4. A computer implemented method according to claim 1, wherein the application of the string replacement method comprises the steps of:

a) traversing the processed exponent value from less significant bit positions to more significant bit positions until a non-zero bit is found and setting a pointer to the non-zero bit position;

b) comparing each of the substrings in the look-up table to substrings of the processed exponent value having a least significant bit at the position indicated by the pointer, to identify a longest matching substring;

c) setting to zero all non-zero bits in the processed exponent value that correspond to non-zero bits in the matching substring;

d) recording a pointer to the value in the look-up table corresponding to the longest matching substring in the least significant bit position of the substring in the processed exponent value; repeating steps a) through d) until no matching values are found in the processed exponent value.

5. A computer implemented method according to claim 4, wherein the step of recording the pointer to the value in the look-up table corresponding to the longest matching substring further includes the step of marking the pointer to the value in the look-up table with an indication that the value is negative when the substring represents a negative value.

6. A computer implemented method according to claim 4, wherein the application of the string replacement method is performed recursively.

7. A computer implemented method according to claim 1, wherein the application of the signed digit algorithm is performed recursively.

8. A computer implemented method according to claim 1, wherein the application of the string replacement method comprises the steps of:
   a) traversing the processed exponent value from more significant bit positions to less significant bit positions until a non-zero bit is found and setting a pointer to the non-zero bit position;
   b) comparing each of the substrings in the look-up table to substrings of the processed exponent value having a most significant bit at the position indicated by the pointer, to identify a longest matching substring;
   c) setting to zero all non-zero bits in the processed exponent value that correspond to non-zero bits in the matching substring;
   d) recording a pointer to the value in the look-up table corresponding to the longest matching substring in the least significant bit position of the substring in the processed exponent; and
   repeating steps a) through d) until no matching values are found in the processed exponent value.

9. A computer implemented method according to claim 8, wherein the step of recording the pointer to the value in the look-up table corresponding to the longest matching substring further includes the step of marking the pointer to the value in the look-up table with an indication that the value is negative when the substring represents a negative value.

10. Apparatus for calculating an encrypted value representing a data string raised to a power represented by a processed exponent value, the apparatus comprising:
   means for applying a signed digit algorithm to the processed exponent value to generate a processed exponent value;
   a look-up table of substrings that are likely to be encountered in the processed exponent value each entry in the look-up corresponding to the data string raised to the power represented by the respective substring;
   means for applying a string replacement method to traverse the processed exponent value and to record pointers to the values in the look-up table that correspond to the matching substrings in the processed exponent value and to replace the matching substrings in the processed exponent value by zeros to produce a modified exponent value; and
   means for applying a multiply-square chain algorithm to the modified exponent value to calculate the encrypted value representing the data string raised to the processed exponent value.

11. Apparatus according to claim 10, wherein the look-up table includes entries corresponding to substring representing the values 3, 5, 7, 9, 11, 13, 15, 17, 19 and 21.

12. A computer readable carrier including computer program instructions, the instructions causing a computer to perform a method calculating a value representing a data string raised to a power represented by a processed exponent value, the method comprising the steps of:
   applying a signed digit algorithm to the processed exponent value to generate a processed exponent value;
   constructing a look-up table of substrings that are likely to be encountered in the processed exponent value each entry in the look-up table being a respective intermediate value corresponding to the data string raised to the power represented by the respective substring;
   applying a string replacement method to traverse the processed exponent value and to record pointers to the values in the look-up table that correspond to the matching substrings in the processed exponent value and replacing the matching substrings in the processed exponent value by zeros to produce a modified exponent value; and
   applying a multiply-square chain algorithm to the modified exponent value to calculate the value representing the data string raised to the exponent value.

13. A method for encrypting a data string by calculating an encrypted value representing the data string raised to a power represented by a exponent value, the method comprising the steps of:
   applying a signed digit algorithm to the exponent value to generate a processed exponent value;
   constructing a look-up table of substrings that are likely to be encountered in the processed exponent value each entry in the look-up table corresponding to the data string raised to the power represented by the respective substring;
   applying a string replacement method to traverse the processed exponent value and retrieving, from the lookup table, and recording, intermediate values corresponding to matching substrings in the processed exponent value and replacing the matching substrings in the processed exponent value by zeros and a reference to the look-up table to produce a modified recoded string representation of the exponent value; and
   applying a multiply-square chain algorithm to the recoded exponent value using the look-up table to calculate the encrypted value representing the data string.

14. A method according to claim 13, wherein the step of constructing a look-up table of substrings that are likely to be encountered in the processed exponent value includes the step of defining an entry in the table for each substring that has an expected frequency of occurrence in the processed exponent value that is greater than one.

15. A method according to claim 14, wherein the binary exponent value is between 100 and 200 bits in length and the look-up table includes entries corresponding to substrings representing the values 3, 5, 7, 9, 11, 13, 15, 17, 19 and 21.

16. A method according to claim 13, wherein the application of the string replacement method comprises the steps of:
   a traversing the processed exponent value from less significant bit positions to more significant bit positions until a non-zero bit is found and setting a pointer to the non-zero bit position;
   b) comparing each of the substrings in the look-up table to substrings of the processed exponent value having a least significant bit at the position indicated by the pointer, to identify a longest matching substring;
   c) setting to zero all non-zero bits in the processed exponent value that correspond to non-zero bits in the matching substring;
   d) recording a pointer to the value in the look-up table corresponding to the longest matching substring in the least significant bit position of the substring in the processed exponent value;
   repeating steps a) through d) until no matching values are found in the processed exponent value.

17. A method according to claim 16, wherein the step of recording the pointer to the value in the look-up table corresponding to the longest matching substring further includes the step of marking the pointer to the value in the look-up table with an indication that the value is negative when the substring represents a negative value.

18. A method according to claim 13, wherein the application of the string replacement method comprises the steps of:
   a) traversing the processed exponent value from more significant bit positions to less significant bit positions until a non-zero bit is found and setting a pointer to the non-zero bit position;
   b) comparing each of the substrings in the look-up table to substrings of the processed exponent value having a most significant bit at the position indicated by the pointer, to identify a longest matching substring;
   c) setting to zero all non-zero bits in the processed exponent value that correspond to non-zero bits in the matching substring;
   d) recording a pointer to the value in the look-up table corresponding to the longest matching substring in the least significant bit position of the substring In the processed exponent; and
   repeating steps a) through d) until no matching values are found in the processed exponent value.

19. A method according to claim 18, wherein the step of recording the pointer to the value in the look-up table corresponding to the longest matching substring further includes the step of marking the pointer to the value in the look-up table with an indication that the value is negative when the substring represents a negative value.

20. Apparatus for encrypting a data string by calculating an encrypted value representing the data string raised to a power represented by a binary exponent value, the apparatus comprising:
   means for applying a signed digit algorithm to the binary exponent value to generate a processed exponent value;
   a look-up table of substrings that are likely to be encountered in the processed exponent value each entry in the look-up corresponding to the data string raised to the power represented by the respective substring;
   means for applying a string replacement method to traverse the processed exponent value and to record pointers to the values in the look-up table that correspond to the matching substrings in the processed exponent value and to replace the matching substrings in the processed exponent value by zeros to produce a modified exponent value; and
   means for applying a multiply-square chain algorithm to the modified exponent value to calculate the encrypted value representing the data string.

21. Apparatus according to claim 20, wherein the look-up table includes entries corresponding to substring representing the values 3, 5, 7, 9, 11, 13, 15, 17, 19 and 21.

22. A computer readable carrier including computer program instructions, the instructions causing a computer to perform a method of encrypting a data string by calculating a value representing a data string raised to a power represented by a binary exponent value, the method comprising the steps of:
   applying a signed digit algorithm to the binary exponent value to generate a processed exponent value;
   constructing a look-up table of substrings that are likely to be encountered in the processed exponent value each entry in the look-up table being a respective intermediate value corresponding to the data string raised to the power represented by the respective substring;
   applying a string replacement method to traverse the processed exponent value and to record pointers to the values in the look-up table that correspond to the matching substrings in the processed exponent value and replacing the matching substrings in the processed exponent value by zeros to produce a modified exponent value; and
   applying a multiply-square chain algorithm to the modified exponent value to calculate the encrypted value representing the data string.

* * * * *